United States Patent
Eslami

(10) Patent No.: US 10,033,918 B2
(45) Date of Patent: Jul. 24, 2018

(54) METHOD AND SYSTEM FOR IMAGE PROCESSING TO DETECT SALIENT OBJECTS IN IMAGE

(71) Applicant: SONY CORPORATION, Tokyo (JP)

(72) Inventor: Ramin Eslami, Milpitas, CA (US)

(73) Assignee: SONY CORPORATION, Tokyo (JP)

( * ) Notice: Subject to any disclaimer, the term of this patent is extended or adjusted under 35 U.S.C. 154(b) by 87 days.

(21) Appl. No.: 15/083,496

(22) Filed: Mar. 29, 2016

(65) Prior Publication Data
US 2017/0289434 A1 Oct. 5, 2017

(51) Int. Cl.
| | |
|---|---|
| *H04N 5/232* | (2006.01) |
| *G06T 7/11* | (2017.01) |
| *G06T 7/90* | (2017.01) |
| *G06T 7/215* | (2017.01) |
| *G06T 5/40* | (2006.01) |
| *G06T 7/194* | (2017.01) |

(52) U.S. Cl.
CPC ............ *H04N 5/23212* (2013.01); *G06T 5/40* (2013.01); *G06T 7/11* (2017.01); *G06T 7/215* (2017.01); *G06T 7/90* (2017.01); *G06T 7/194* (2017.01); *G06T 2207/10024* (2013.01)

(58) Field of Classification Search
CPC .... H04N 5/2226; H04N 5/23212; G06T 7/11; G06T 7/194; G06T 2207/20164
See application file for complete search history.

(56) References Cited

U.S. PATENT DOCUMENTS

| | | | |
|---|---|---|---|
| 5,315,409 A | 5/1994 | Matsumura et al. | |
| 6,282,317 B1 | 8/2001 | Luo et al. | |
| 7,085,401 B2 | 8/2006 | Averbuch et al. | |
| 8,295,607 B1 | 10/2012 | Biswas et al. | |
| 8,873,845 B2 | 10/2014 | Wang et al. | |
| 2014/0044349 A1* | 2/2014 | Wang ................ | G06F 17/3025 382/162 |

* cited by examiner

*Primary Examiner* — Paul Berardesca
(74) *Attorney, Agent, or Firm* — Chip Law Group

(57) ABSTRACT

Various aspects of a system and method for image-processing are disclosed herein. The method, implemented in an image-processing device, comprises computation of an average bin value of a histogram for a first color channel of an image. The histogram includes a plurality of bins with a pre-determined bin size, based on pixel values of the first color channel. An adaptive threshold step size is determined for each bin in the histogram, based on a ratio of a bin value of each bin of the plurality of bins and the computed average bin value of the histogram. The method further includes computation of a set of Boolean maps that correspond to a set of threshold values, based on the adaptive threshold step size for each bin. A saliency map is generated based on the computed set of Boolean maps.

20 Claims, 5 Drawing Sheets

METHOD AND SYSTEM FOR IMAGE PROCESSING TO DETECT SALIENT OBJECTS IN IMAGE

CROSS-REFERENCE TO RELATED APPLICATIONS/INCORPORATION BY REFERENCE

None.

FIELD

Various embodiments of the disclosure relate to a method and system for image processing. More specifically, various embodiments of the disclosure relate to a method and a system for image processing to detect salient objects in an image.

BACKGROUND

With various advancements in the field of image-processing, the quality of images captured by image-capturing devices has improved. Generally, enhanced quality may be based on the appropriate adjustment of imaging parameters of the image-capturing devices to complement an imaging scene. Typically, for high-quality image capture, there are objects of various types that may be required to be captured through various adjustments of the imaging parameters. For instance, a background object and/or a region in the scene may lie further away that a foreground object in the scene. In such a scenario, the foreground object may need to be identified and separated from the background object and/or region in the scene. The salient object may be an object-of-interest in the image, and hence, a foreground object. Separation of the foreground object from the background object and/or region in the scene may help in automatic configuration of the imaging parameters, such as, an auto-focus parameter of the image-capturing device. This may be done to clearly focus towards the foreground subject, or any other object-of-interest in the scene. Hence, there is a need for a method and/or system for accurate identification of salient objects in an image for automatic configuration of the imaging parameters of the image-capturing device.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system for image processing to detect salient objects in an image are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
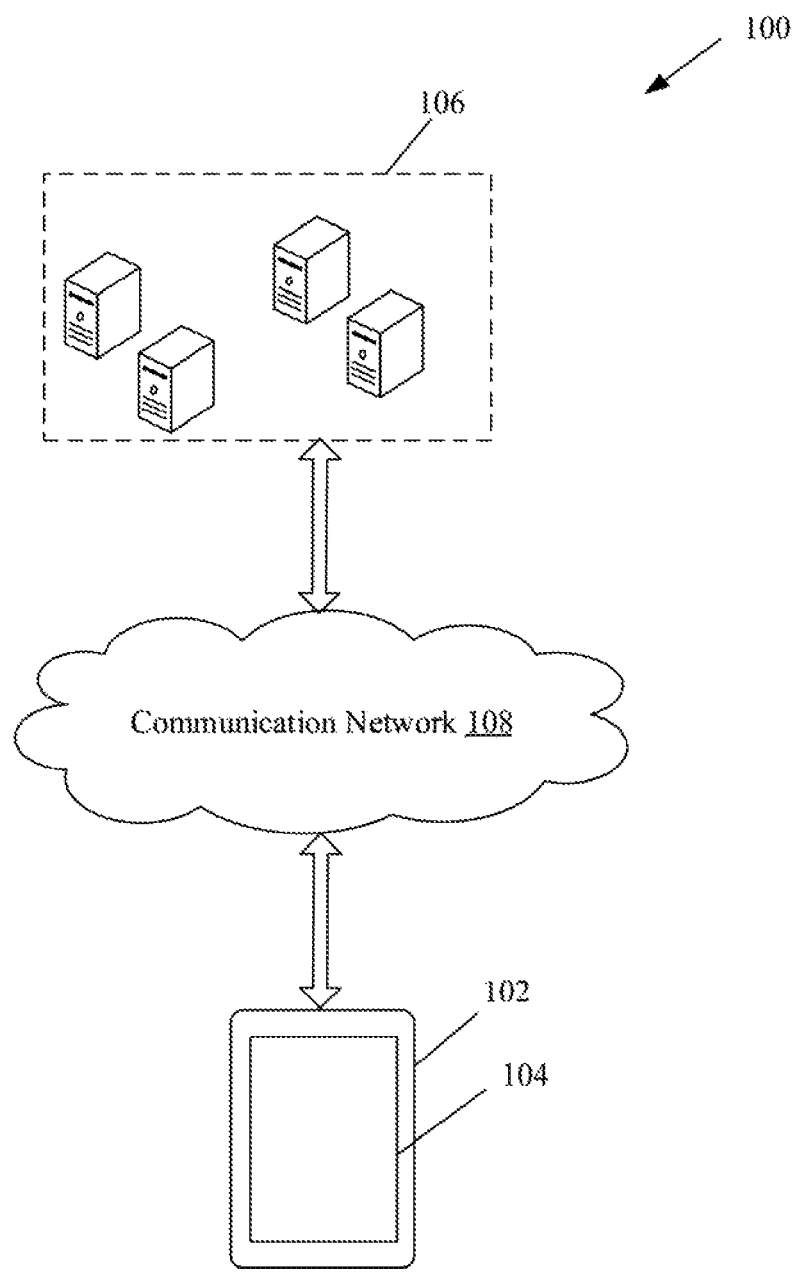
FIG. 1 is a block diagram that illustrates a network environment, in accordance with an embodiment of the disclosure.

The following described implementations may be found in the disclosed method and system for image processing. Exemplary aspects of the disclosure may include a method implementable in an image-processing device. The image-processing device may be communicatively coupled to an image-capturing device. Alternatively, the image-capturing device may be built into the image-processing device. The image-processing device may be configured to compute an average bin value of a histogram for a first color channel of an image captured by the image-capturing device. The histogram may include a plurality of bins with a pre-determined bin size, based on pixel values of a plurality of pixels in the first color channel. Further, an adaptive threshold step size may be determined for each bin of the plurality of bins in the histogram by the image-processing device. The determination of the adaptive threshold step size may be based on a ratio of a bin value of each bin of the plurality of bins and the computed average bin value of the histogram. Thereafter, a set of Boolean maps that may correspond to a set of threshold values may be computed by the image-processing device. The set of threshold values may be determined based on the adaptive threshold step size for each bin. A saliency map may be generated by the image-processing device, based on the computed set of Boolean maps.

In accordance with an embodiment, the image-processing device may be further configured to convert a set of color channels of a first color model to a corresponding set of color channels of a second color model to obtain the image with de-correlated color channels. The converted set of color channels may include at least the first color channel.

In accordance with an embodiment, a count of the determined set of threshold values of the first color channel of the set of color channels may be based on the determined adaptive threshold step size, a minimum pixel value, and/or a maximum pixel value of the first color channel. In accordance with an embodiment, the image-processing device may be configured to determine a coefficient value, based on the ratio of the bin value of each bin of the plurality of bins and computed average bin value of the histogram. The adaptive threshold step size may be determined based on the coefficient value and the predetermined bin size. In accordance with an embodiment, the image-processing device may be configured to perform adaptive thresholding of the pixel values of the plurality of pixels in the first color channel, based on the determined adaptive threshold step size.

In accordance with an embodiment, a plurality of Boolean maps may be generated for the set of color channels. The generated plurality of Boolean maps may include the computed set of Boolean maps for the first color channel. The first color channel may belong to the set of color channels of the second color model, as discussed above.

In accordance with an embodiment, the image-processing device may be configured to stack the generated plurality of Boolean maps for the set of color channels. Further, one or more regions that touch one or more boundaries of the image may be identified. The image-processing device may be configured to process the stacked plurality of Boolean maps to generate a plurality of processed Boolean maps, based on removal of the one or more regions, which touch the one or more boundaries of the image.

In accordance with an embodiment, the image-processing device may be configured to add the generated plurality of processed Boolean maps for the generation of the saliency map. Further, the image-processing device may be configured to normalize the added plurality of processed Boolean maps for the generation of the saliency map.

In accordance with an embodiment, the image-processing device may be configured to detect a region-of-interest that may correspond to a salient region in the image, based on the generated saliency map. The saliency map may be representative of a first set of color values that may have a lower frequency of occurrence in the image than a second set of color values in the image. The first set of color values may correspond to the salient region. Further, the first set of color values may be associated with one or more of a foreground object and/or a moving object. On the other hand, the second set of color values may be at least associated with a background region in the image.

In accordance with an embodiment, the image-processing device may be configured to automatically-adjust one or more auto-focus settings of the image-capturing device associated with the image-processing device, based on the generated saliency map of the image. In accordance with an embodiment, the image-capturing device may dynamically adjust the one or more auto-focus settings for an image/video capture, based on information related to the saliency map received from the image-processing device.

FIG. 1 is a block diagram that illustrates a network environment, in accordance with an embodiment of the disclosure. With reference to FIG. 1, there is shown a network environment 100. The network environment 100 may include an image-processing device 102, a display screen 104, a plurality of cloud-based resources 106, and a communication network 108. The image-processing device 102 may comprise the display screen 104. The image-processing device 102 may be communicatively coupled to the plurality of cloud-based resources 106, via the communication network 108.

The image-processing device 102 may comprise suitable logic, circuitry, interfaces, and/or code that may be configured to process an image or a video frame. In accordance with an embodiment, the image or the video frame may be received from an image-capturing device (not shown in FIG. 1), which may be configured to capture the image or the video frame. The image-capturing device either may in-built in the image-processing device or may be a separate device. In another scenario, the image-processing device may receive the image or the video frame from the plurality of cloud-based resources 106, on which the image-capturing device may upload the image or the video frame. The image-processing device 102 may be configured to detect one or more salient objects from the processing image or video frame. The image-processing device 102 may be further configured to automatically adjust one or more auto-focus settings of the image-capturing device, based on the one or more salient objects detected in the processed image or video frame. Examples of the image-processing device 102 may include, but may not be limited to, a smartphone, a camera, a tablet computer, a laptop, a camcorder, a server, and/or a wearable electronic device.

The display screen 104 may comprise suitable circuitry and/or interfaces that may be configured to display the image or video frame. The display screen 104 may be further configured to display the one or more salient objects, on which a focus may be adjusted automatically. The display screen 104 may be realized through several known technologies, such as but are not limited to, Liquid Crystal Display (LCD) display, Light Emitting Diode (LED) display, and/or Organic LED (OLED) display technology.

The plurality of cloud-based resources 106 may comprise one or more servers that may provide image data to one or more subscribed electronic devices, such as the image-processing device 102. In accordance with an embodiment, the plurality of cloud-based resources 106 may correspond to a plurality of data-centers that may store the plurality of images and/or video frames uploaded by the image-capturing device and/or the image-processing device 102. In such a case, the image-processing device 102 may download the image or the video frame for processing from the plurality of cloud-based resources 106. In accordance with an embodiment, the plurality of cloud-based resources 106 may correspond to a plurality of computing-centers, which may provide a distributed computing infrastructure for the processing of the image or the video frame to the image-processing device. In such a scenario, the image-processing device 102 may send a request to one or more computing resources, such as one or more processor instances and/or one or more memory instances, from the plurality of cloud-based resources 106. Based on the request, the plurality of cloud-based resources 106 may provide the one or more computing resources to the image-processing device 102, to process the image or the video frame for the generation of the saliency map.

A person with ordinary skill in the art may understand that an owner/user of the image-processing device 102 may be charged a usage fee based on usage time and/or a number of instances and a type of the one or more computing resources provided to the image-processing device 102. Further, in an embodiment, the plurality of cloud-based resources 106 may correspond to a combination of data centers and computing centers. The plurality of cloud-based resources 106 may be implemented by use of several technologies that are well known to those skilled in the art. The one or more servers from the plurality of cloud-based resources 106 may be associated with a single or multiple service providers.

The communication network 108 may include a medium through which the image-processing device 102 may communicate with the one or more servers, such as the plurality of cloud-based resources 106. The communication network 108 may be a wired or wireless communication network. Examples of the communication network 108 may include, but are not limited to, a Local Area Network (LAN), a Wireless Local Area Network (WLAN), a cloud network, a Long Term Evolution (LTE) network, a plain old telephone service (POTS), a Metropolitan Area Network (MAN), and/or the Internet. Various devices in the network environment 100 may be configured to connect to the communication network 108, in accordance with various wired and wireless communication protocols. Examples in such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols.

In operation, the image-processing device 102 may be configured to receive an image or a video frame from the plurality of cloud-based resources 106, via the communication network 108. As discussed above, the image or the video frame may be uploaded on the plurality of cloud-based resources 106 by the image-capturing device (described in conjunction with FIG. 2), which may be configured to capture the image or the video frame. The image-capturing device may be in-built in the image-processing device 102 or may be implemented as a separate device. Alternatively, the image or the video frame may be pre-stored in a memory of the image-processing device 102.

In accordance with an embodiment, the image-processing device 102 may be configured to convert a set of color channels of a first color model to a corresponding set of color channels of a second color model to obtain a version of the image that includes de-correlated color channels. The converted set of color channels may correspond to the de-correlated color channels and include at least a first color channel. For instance, the image may initially be represented in a red, green, and blue (RGB) color model with red, green, and blue color channels, which may have a high correlation with respect to visual color perception. The image-processing device 102 may convert the image from the RGB color model to a luma, blue chroma, and red chroma ($YC_bC_r$) color model with Y, $C_b$, and $C_r$ color channels, which may have a lower correlation with respect to visual color perception.

In accordance with an embodiment, for the first color channel, the image-processing device 102 may be configured to generate a histogram. The histogram may include a plurality of bins with a pre-determined bin size, based on pixel values of a plurality of pixels in the first color channel. For instance, the image-processing device 102 may generate a histogram $H_1$ for the "Y color channel" in the set of de-correlated color channels (Y, $C_b$, $C_r$ color channels). The histogram $H_1$ may include "32 bins" with bins-size of "8" each, based on pixel values of the "Y color channel" in the image from "0" to "255". A person with ordinary skill in the art may understand that the disclosure is described with respect to the first color channel. However, similar histograms may also be generated for the other color channels in the set of de-correlated color channels. Further, similar processing, as mentioned with respect to the first color channel, may be performed for the other color channels, to generate the saliency map of the image. In accordance with an embodiment, the conversion of the set of color channels of the first color model, that may be referred to as "whitening", may not occur. The color channels may not be de-correlated.

In accordance with an embodiment, the image-processing device 102 may be configured to compute an average bin value of the histogram for at least the first color channel. The image-processing device 102 may be configured to determine an adaptive threshold step size for each bin of the plurality of bins in the histogram for the first color channel. In accordance with an embodiment, the image-processing device 102 may be configured to determine a coefficient value. The coefficient value may be used to determine the adaptive threshold step size. The coefficient value may be computed from a ratio of the bin value of each bin of the plurality of bins and the computed average bin value of the histogram. The adaptive threshold step size may be computed based on the determined coefficient value and the predetermine bin size. Thus, the determination of the adaptive threshold step size may be based on the ratio of a bin value of each bin of the plurality of bins and the computed average bin value of the histogram.

In accordance with an embodiment, the image-processing device 102 may be configured to determine a set of threshold values, based on the predetermined adaptive threshold step size for each bin. The set of threshold values may then be used by the image-processing device 102, the adaptive thresholding of the pixel values of the plurality of pixels in the first color channel. In accordance with an embodiment, a count of the set of threshold values of the first color channel of the set of color channels may be based on the determined adaptive threshold step size, a minimum pixel value, and a maximum pixel value of said first color channel. A mathematical expression of the count of the set of threshold values is explained in FIG. 2.

In accordance with an embodiment, the image-processing device 102 may be further configured to compute a set of Boolean maps that may correspond to the set of threshold values, computed based on the determined adaptive threshold step size. In a manner similar to the generation of the set of Boolean maps for the first color channel, a plurality of Boolean maps may be generated for complete set of color channels. A person with ordinary skill in the art may understand that the generated plurality of Boolean maps may include the computed set of Boolean maps for the first color channel (such as the Y color channel), as the first color channel may belong to the set of color channels (such as the Y, $C_b$, $C_r$ color channels) of the second color model (such as the Y $C_b$ $C_r$ color model). Thus, the plurality of Boolean maps may include a first set of Boolean maps for the "Y color channel", a second set of Boolean maps for the "$C_b$ color channel", and a third set of Boolean maps for the "$C_r$ color channel".

In accordance with an embodiment, the image-processing device 102 may be configured to stack the generated plurality of Boolean maps for the set of color channels. In other words, Boolean maps of all color channels may be stacked. Further, the image-processing device 102 may identify one or more regions in the image that touch one or more boundaries of the image, by use of one or more image-processing techniques. Examples of image-processing techniques may include, but are not limited to, connected component analysis, region growing algorithm, and/or region splitting algorithm. The image-processing device 102 may be configured to process the stacked plurality of Boolean maps to generate a plurality of processed Boolean maps, based on removal of the one or more regions, which touch the one or more boundaries of the image.

In accordance with an embodiment, the image-processing device 102 may be configured to add the generated plurality of processed Boolean maps for the generation of the saliency map. Further, the image-processing device 102 may be configured to normalize the added plurality of processed Boolean maps during the generation of the saliency map. In accordance with an embodiment, image-processing device 102 may assign a weight to each of the plurality of processed Boolean maps to normalize the addition of the plurality of processed Boolean maps for generation of the saliency map. The weight may correspond to the color channel associated with a particular Boolean map from the plurality of processed Boolean maps. In accordance with an embodiment, the weight associated with a particular Boolean map may be determined based on a maximum pixel value, a minimum pixel value, and/or a weighted average pixel value (average pixel value based on frequency of occurrence of pixel values) that corresponds to a particular color channel. The process of normalization is explained further in FIG. 2.

In accordance with an embodiment, the image-processing device 102 may be configured to detect a region-of-interest that may correspond to a salient region in the image. The detection of the region-of-interest may be based on the generated saliency map. The saliency map may be representative of a first set of color values that may have a lower frequency of occurrence in the image than a second set of color values in the image. The first set of color values may be referred to as rare colors as compared to other frequent colors in the processed image. The first set of color values may correspond to the salient region. Further, the first set of color values may be associated with one or more of a foreground object and/or a moving object. On the other hand, the second set of color values may be at least associated with a background region in the image. In accordance with an embodiment, the image-processing device 102 may be configured to display the salient region in the image to a user, as a highlighted region, via the display screen 104. Thus, a rarity of the colors present in the saliency map may be promoted based on the determined adaptive threshold step size.

In accordance with an embodiment, the image-processing device 102 may be configured to automatically adjust one or more auto-focus settings of the image-capturing device associated with the image-processing device 102, based on the generated saliency map of the image. Examples of the one or more auto-focus settings may include, but may not be limited to, a lens-aperture setting, a facial/smile detection setting, International Organization for Standardization (ISO) sensitivity setting, an image-focus setting, and/or an auto-exposure setting. In accordance with an embodiment, the image-capturing device may dynamically adjust the one or more auto-focus settings for image/video capture, based on information related to the saliency map received from the image-processing device 102.

Figure 2:
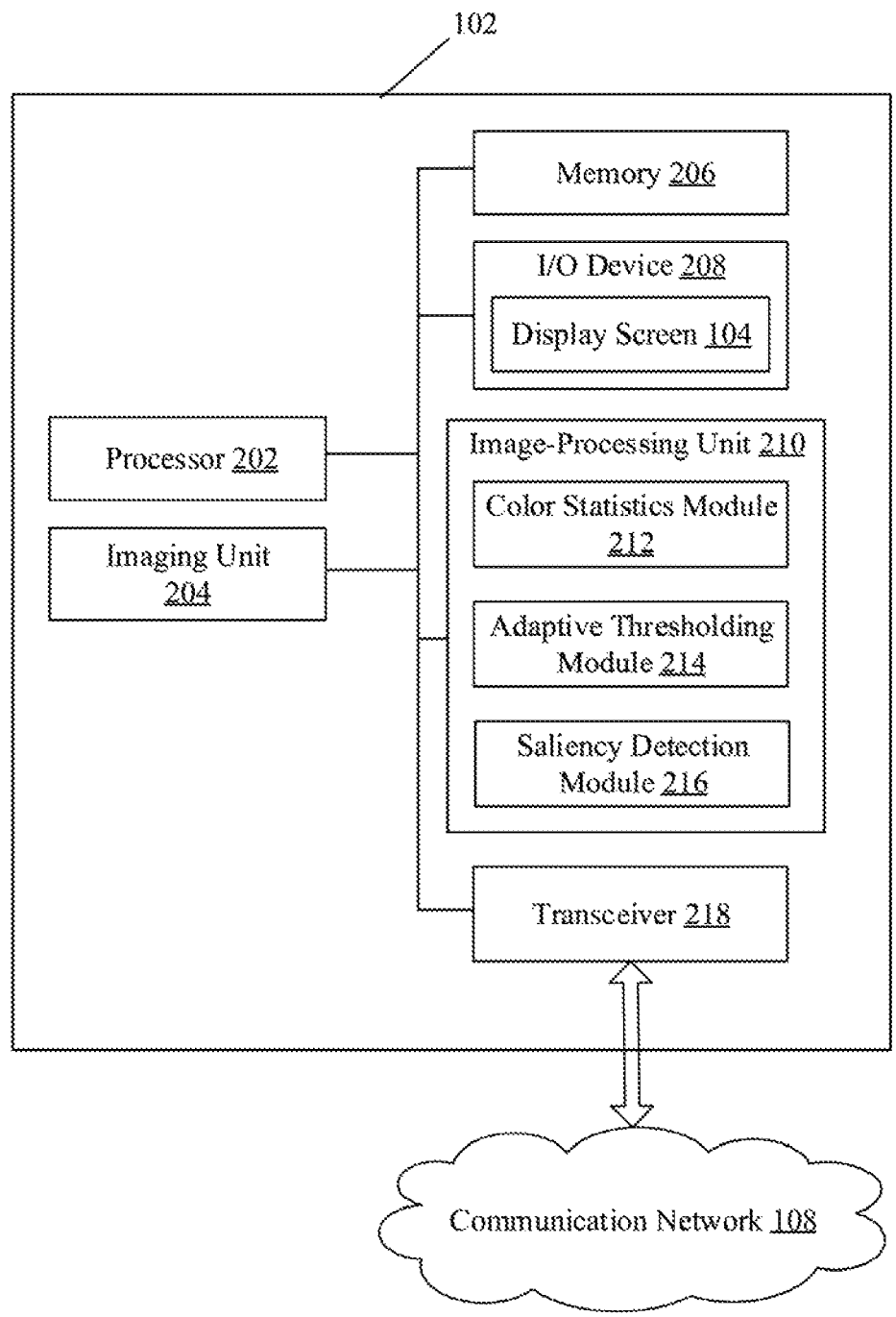
FIG. 2 is a block diagram that illustrates various components of an image-processing device, in accordance with an embodiment of the disclosure.

FIG. 2 is a block diagram that illustrates various components of an image-processing device to detect salient objects in an image, in accordance with an embodiment of the disclosure. FIG. 2 is explained in conjunction with elements from FIG. 1. With reference to FIG. 2, there is shown the image-processing device 102, which may include a processor 202, an imaging unit 204, a memory 206, an input/output (I/O) device 208, and an image-processing unit 210. The I/O device 208 may further include the display screen 104. The image-processing unit 210 may include a color statistics module 212, an adaptive thresholding module 214, and a saliency detection module 216. There is further shown a transceiver 218 in the image-processing device 102.

In accordance with an embodiment, the processor 202 may be communicatively coupled to the various components of the image-processing device 102, such as the imaging unit 204, the memory 206, the I/O device 208, the image-processing unit 210, and the transceiver 218, via a system bus. In accordance with an embodiment, the transceiver 218 may enable the image-processing device 102 to be communicatively coupled to the other units and/or devices, such as the plurality of cloud-based resources 106, via the communication network 108.

The processor 202 may comprise suitable logic, circuitry, interfaces, and/or code that may be configured to process an image or a video frame. The image or video frame may be processed for generation of a saliency map that may be representative of one or more salient objects in the image or video frame. The processor 202 may be further configured to enable automatic adjustment of auto-focus settings associated with the imaging unit 204, based on the one or more salient objects detected in the processed image or video frame. The processor 202 may be communicatively coupled to the image-processing unit 210, to process the image or video frame. Examples of the processor 202 may be an x86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a digital signal processor (DSP), a graphics processor unit (GPU), a coprocessor, and/or other processors or integrated circuits.

The imaging unit 204 may comprise suitable logic, circuitry, interfaces, and/or code that may be configured to capture one or more images and/or video frames within a field-of-view (FOV) of the imaging unit 204. The imaging unit 204 may further generate visual representations of the captured one or more images and/or video frames. The imaging unit 204 may include a lens assembly and an image sensor that may enable the imaging unit 204 to capture the one or more images and/or video frames. The image sensor of the imaging unit 204 may be implemented by use of a charge-coupled device (CCD) technology, complementary metal-oxide-semiconductor (CMOS) technology, and/or the like. A person with ordinary skill in the art may understand that although the imaging unit 204 is shown as a component of the image-processing device 102, the imaging unit 204 may also be implemented as a separate device that may be communicatively coupled to the image-processing device, through the communication network 108, via the transceiver 218.

The memory 206 may comprise suitable logic, circuitry, and/or interfaces that may be configured to store a set of instructions executable by the processor 202. In accordance with an embodiment, the memory 206 may be further configured to store the one or more images and/or video frames captured by the imaging unit 204. In accordance with an embodiment, the memory 206 may be further configured to store one or more images and/or video frames received from an external unit, such as the plurality of cloud-based resources 106, via the transceiver 218. Examples of types of the memory 206 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), Read Only Memory (ROM), Hard Disk Drive (HDD), and/or a Secure Digital (SD) card, and/or cache memory.

The I/O device 208 may comprise suitable logic, circuitry, interfaces, and/or code that may be configured to receive an input from a user (not shown). The input from the user may correspond to a command to capture an image and/or a video frame of a scene. The I/O device 208 may be further configured to provide an intermediate output and a final output to the user. The intermediate output may correspond to visualization of a saliency map. The final output may correspond to a visualization that may include one or objects that are more salient, highlighted in the captured image and/or video frame of the scene, on which a focus may be suitably auto-adjusted by the processor 202.

The I/O device 208 may comprise various input and output devices that may be configured to communicate with the processor 202. Examples of the input devices may include, but may not be limited to, the imaging unit 204, a camcorder, a touch screen, a keyboard, a mouse, a joystick, a microphone, a motion sensor, a light sensor, and/or a docking station. Examples of the output devices may include, but may not be limited to, the display screen 104, a projector screen, and/or a speaker. The display screen 104 may be further configured to display the one or more salient objects.

The display screen 104 may be configured to receive one or more input actions from the one or more users, via a touch-sensitive screen. Such one or more input actions may be received from the one or more users by means of a virtual keypad, a stylus, touch-based input actions, and/or a gesture. The display screen 104 may be further configured to display an output associated with the captured image or video frame to the user. The output may include the captured image or video frame, a representation of the saliency map of the image or video frame, or an indication of the one or more salient object objects in an enhanced version of the image (a sharper image) or video frame (based on automatic auto-focus setting adjustment). The display screen 104 may be realized through several known technologies such as, but not limited to, Liquid Crystal Display (LCD) display, Light Emitting Diode (LED) display, plasma display, and/or Organic LED (OLED) display technology.

The image-processing unit 210 may comprise suitable logic, circuitry, interfaces and/or code that may be configured to perform image processing on one or more images or video frames to generate a saliency map for each image or video frame. The saliency map may be representative of one or more salient objects in the image or video frame. In accordance with an embodiment, the image-processing unit 210 may be a part of the processor 202. Alternatively, the image-processing unit 210 may be implemented as a separate processor or circuitry in the image-processing device 102. In accordance with an embodiment, the image-processing unit 210 and the processor 202 may be implemented as an integrated processor or a cluster of processors that perform the functions of the image-processing unit 210 and the processor 202. In accordance with an embodiment, the image-processing unit 210 may be implemented as a set of instructions stored in the memory 206, which on execution by the processor 202 may perform the function of the image-processing unit 210.

The color statistics module 212 may comprise suitable logic, circuitry, interfaces, and/or code that may be configured to generate a histogram for each color channel in the image or the video frame. Further, the color statistics module 212 may be configured to perform statistical computations related to pixel values in the image and bin values in the histogram. For instance, the color statistics module 212 may determine the pre-determined bin size associated with the histogram for a first color channel in the image or the video frame. Further, the color statistics module 212 may compute the average bin value of the histogram for the first color channel.

The adaptive thresholding module 214 may comprise suitable logic, circuitry, interfaces, and/or code that may be configured to determine an adaptive threshold step size for each bin in the histogram for the first color channel. Further, the adaptive thresholding module 214 may be configured to determine a coefficient value based on the ratio of a bin value of each bin and the computed average bin value of the histogram for the first color channel. The adaptive threshold step size may be determined based on the coefficient value and the predetermined bin size in the histogram. Thereafter, based on the adaptive threshold step size, the adaptive thresholding module 214 may determine a set of threshold values. The determined set of threshold values may be used to perform adaptive thresholding of the pixel values in the image for the first color channel, based on the determined set of threshold values. In accordance with an embodiment, the adaptive thresholding module 214 may be further configured to compete a set of Boolean maps that may correspond to the set of threshold values, based on the adaptive threshold step size for each bin, for the first color channel.

A person with ordinary skill in the art may understand that the color statistics module 212 and the adaptive thresholding module 214 may process the other color channels in which the pixel values of the image or the video frame are represented, in a manner similar to the first color channel. The color channels that may be used for representation of pixel values of the image or the video frame are hereinafter collectively referred as "the set of color channels".

For instance, the color statistics module 212 may generate three histograms, one for each color channel, for three color channels that may represent pixel values of the image or the video frame (such as a YUV color model). Similarly, the adaptive thresholding module 214 may compute three sets of Boolean maps from the adaptive thresholding of the respective three histograms of the three color channels. The multiple sets of Boolean maps that may be generated for the set of color channels associated with the image or the video frame are hereinafter collectively referred as "the plurality of Boolean maps". A person skilled in the art may understand that as the first color channel belongs to the set of color channels, the set of Boolean maps for the first color channel are also included in the plurality of Boolean maps for the set of color channels.

The saliency detection module 216 may comprise suitable logic, circuitry, interfaces, and/or code that may be configured to generate the saliency map based at least on the computed set of Boolean maps. In accordance with an embodiment, the saliency detection module 216 may be configured to stack the plurality of Boolean maps determined for the set of color channels. The saliency detection module 216 may be further configured to identify one or more regions in image or the video frame that touch one or more boundaries of the image or the video frame. The plurality of Boolean maps may be processed to generate a plurality of processed Boolean maps, based on removal of the one or more identified regions that touch the one or more boundaries of the image or the video frame. Further, the saliency detection module 216 may be configured to add the plurality of processed Boolean maps and normalize the added plurality of processed Boolean maps, to generate the saliency map of the image or the video frame. The saliency detection module 216 may then determine one or more regions-of-interest that may include a salient region based on the saliency map. The salient region may include one or more salient objects.

A person with ordinary skill in the art may understand that one or more functionalities of the color statistics module 212, adaptive thresholding module 214, and/or the saliency detection module 216, may be interchangeably implemented by one or more of these modules. Further, one or more of these modules may be implemented as an embedded system and/or system-on-chip (SoC) associated with and/or included within the processor 202.

The transceiver 218 may comprise suitable logic, circuitry, interfaces, and/or code that may be configured to transmit as well as receive the image to/from the one or more communicatively-coupled units. The one or more communicatively-coupled units may include the processor 202, the imaging unit 204, the memory 206, the I/O device 208, and the image-processing unit 210. The transceiver 218 may be configured to communicate with the plurality of cloud-based resources 106, via the communication network 108, as shown in FIG. 1. The transceiver 218 may be implemented by technologies known in the art, to support wired or wireless communication of the image-processing device 102, with communication network 108. Various components of the transceiver 218 may include, but are not limited to, an antenna, a radio frequency (RF) transceiver, one or more amplifiers, a tuner, one or more oscillators, a digital signal processor, a code-decoder (CODEC) chipset, a subscriber identity module (SIM) card, and/or a local buffer.

The transceiver 218 may communicate, via wireless communication, with networks (such as the Internet and/or the Intranet) and/or a wireless network (such as a cellular telephone network, a wireless local area network (LAN) and/or a metropolitan area network (MAN)). The wireless communication may use any of a plurality of communication standards, protocols and technologies, such as Global System for Mobile Communication (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the transceiver 218, in the image-processing device 102, may be configured to receive an image from the imaging unit 204, via the communication network 108. The image may correspond to a scene of a landscape, cityscape, football match, tennis match, badminton match, street-play, and/or the like. In such a case, the imaging unit 204 may be configured to capture the image or a video frame, in response to a request triggered by a user. The request may be triggered based on an action, such as hardware or software button-press action, at the image-processed device 102.

In accordance with an embodiment, the transceiver 218 may be configured to communicate the received image to the processor 202. In accordance with an embodiment, the processor 202 may be configured to receive the image from the memory 206. In such a case, the image may be temporarily stored in the memory 206. In accordance with an embodiment, the processor 202 may be configured to receive the image from the memory 206. In accordance with an embodiment, the image may be of a pre-specified resolution in a plurality of color channels. In accordance with an embodiment, the image may comprise background and foreground objects.

In accordance with an embodiment, the processor 202 may be configured to perform whitening of the colors in the image. The whitening of the colors may de-correlate the plurality of color channels of the image, for reduction of cross-correlation within the plurality of color channels. The de-correlation may be performed by the processor 202, based on one or more de-correlation techniques known in the art, such as a matched linear filter. Based on the de-correlation, the processor 202 may perform conversion of a color model used to represent pixel values in the image or the video frame. For instance, a set of color channels (Red, Green, and Blue color channels) of a first color model (RGB color model) may be converted to a corresponding set of color channels (Y, $C_b$, and $C_r$ color channels) of a second color model ($YC_bC_r$ color model). This may be done to obtain a version of the image or video frame with de-correlated color channels. The converted set of color channels may include a first color channel (such as the Y color channel).

In accordance with an embodiment, the color statistics module 212 may be configured to analyze distribution of pixels values for each color channel in the set of color channels in the image or the video frame. Thereafter, the color statistics module 212 may generate one histogram each for the set of color channels. For instance, the color statistics module 212 may generate a histogram $H_{C1}$ for the first color channel (such as the Y color channel) in the image or the video frame. In cases when the pre-determined bin size is "16" and pixel value range between "0" to "255" for the first color channel, the histogram $H_{C1}$ may include a total of "16" bins. The threshold step size in the case of uniform thresholding is half of the bin size.

In the above example, with the predetermined bin size of 16 and the threshold step size "8" (that is half of the bin size 16), a threshold set for uniform thresholding of the pixel values in the first color channel is: {0, 8, 16, ... 248}. Once the color statistics module 212 generates a the histogram $H_{C1}$, the color statistics module 212 may compute the average bin value, "avg_bin ($H_{C1}$)", of the histogram $H_{C1}$ for the first color channel, based on the pixel values that lie in each bin of the histogram $H_{C1}$, computed using the following expression:

$$\text{avg\_bin}(H_{C1}) = \frac{\text{Count\_pixels}}{\text{No. of bins}} \quad (1)$$

where, "avg_bin ($H_{C1}$)" represents average bin value of the histogram $H_{C1}$ for the first color channel; "count_pixels" represents total number of pixels in the image or the video frame; and "No: of bins" represents total number of bins in the histogram $H_{C1}$.

In accordance with an embodiment, the adaptive thresholding module 214 may be configured to determine the adaptive threshold step size for each bin in the histogram $H_{C1}$ for the first color channel. Further, the adaptive thresholding module 214 may be configured to determine the coefficient value, represented as "d", based on a ratio "J". The value "J" may be determined as the ratio of the bin value of each bin and the computed average bin value of the histogram $H_{C1}$ for the first color channel, using the following expression:

$$J[i] = \frac{\text{bin\_val}[i]}{\text{avg\_bin}(H_{C1})} \quad (2)$$

\where, "J[i]" represents the value of the ratio J for the $i^{th}$ bin of the histogram $H_{C1}$; "bin_val[i]" represents the count of pixel values belonging to the $i^{th}$ bin of the histogram $H_{C1}$; and "avg_bin($H_{C1}$)" represents the average bin value (average number of pixels that are assigned to each bin) of the histogram $H_{C1}$ for the first color channel.

In accordance with an embodiment, the coefficient value "d" may be determined based on the value of the ratio "J", based on the following conditions:

$$\text{if } J[i] < 1.5, \ d[i] = 4 \quad (3.1)$$

$$\text{else if } 1.5 \leq J[i] < 2.5, \ d[i] = 3 \quad (3.2)$$

$$\text{else if } 2.5 \leq J[i] < 3.5, \ d[i] = 2 \quad (3.3)$$

$$\text{else } d[i] = 1 \quad (3.4)$$

where, "J[i]" represents the value of the ratio J for the $i^{th}$ bin of the histogram $H_{C1}$; and "d[i]" represents the value of the coefficient d for the $i^{th}$ bin of the histogram $H_{C1}$.

The adaptive threshold step size may be determined based on the coefficient value and the predetermined bin size in the histogram, by use of the following expression:

$$t[i] = \frac{2s}{d[i]} \quad (4)$$

where, "t[i]" represents the adaptive threshold step size for the $i^{th}$ bin in the histogram $H_{C1}$; "s" represents the threshold step size for uniform thresholding, where the pre-determined bin size of the histogram $H_{C1}=2*s$; and "d[i]" represents the value of the coefficient d for the $i^{th}$ bin of the histogram $H_{C1}$.

In accordance with an embodiment, based on the adaptive threshold step size of each bin in the histogram, the adaptive thresholding module 214 may determine a set of threshold values. The determined set of threshold values may be used to perform adaptive thresholding of the pixel values in the image for the first color channel. For example, this may occur in a case where there are 256 pixels in the image that range from "0" to "31" for a particular color channel. Further, when the pre-determined bin size of a histogram for that color channel is "8" (i.e., 2 s=8) and that the histogram includes four bins with bin values 160, 10, 70, and 16. Here, the average bin value is (160+10+70+16)/4, which is 64. For the first bin, j[1] may be determined as 160/64, which is 2.5. Hence, based on condition 3.3, d[1] may be determined as 2 and the adaptive threshold size t[1] for the first bin may be determined as 8/2, which is 4. Similarly, for the second bin, j[2] may be determined as 10/64, which is 0.156. Hence, based on condition 3.1, d[2] may be determined as 4 and the adaptive threshold step size t[2] for the second bin may be determined as 8/4, which is 2.

In a similar manner, the adaptive threshold step sizes t[3] and t[4] for the third bin and the fourth bin may be determined as 2 each. Based on the determined adaptive threshold step sizes, the adaptive thresholding module 214 may determine the set of threshold values to perform adaptive thresholding of the pixel values in the image or the video frame for the first color channel. For instance, in the above example, the adaptive thresholding module 214 may divide the first bin into two equal parts of size 4 each. The first part may be used as an "adapted bin" for pixel values from "0" to less than "4", while the second part may be used as another "adapted bin" for pixel value and "4" to less than "8". Similarly, the second bin may be divided into four adapted bins to size 2 each. The four adapted bins, formed from the second bin, may include pixel values from "8" to less than "10", "10" to less than "12", "12" to less than "14", and "14" to less than "16". Hence, the resultant set of threshold values may include: [0, 4, 8, 10, 12, 14, 16, 18, 20, 22, 24, 26, 28, 30]. A person with ordinary skill in the art may understand that a count of the determined set of threshold values may be based on a maximum pixel value, a minimum pixel value, and adaptive threshold step size of the histogram.

In accordance with an embodiment, the adaptive thresholding module 214 may be further configured to compute the set of Boolean maps that may correspond to the set of threshold values, based on the adaptive threshold step size for each bin, for the first color channel. In accordance with an embodiment, the adaptive thresholding module 214 may use the following expression to compute the set of Boolean maps that may correspond to the set of threshold values:

$$B[x, y] = \begin{cases} 1, & \text{if } u[x, y] > th \\ 0, & \text{otherwise} \end{cases} \quad (5)$$

where, "B[x,y]" represents binary value associated with the Boolean map for the threshold "th" for pixel at (x, y) co-ordinate location in the image or the video frame; "u" represents the first color channel from the set of color channels; and "th" represents a threshold value from the set of threshold values determined based on the adaptive threshold step size.

In accordance with an embodiment, the adaptive thresholding module 214 may be configured to compare pixel value of a particular color channel (such as the first color channel, for instance, the Y color channel) at each co-ordinate location in the image or the video frame with each of the respective thresholds in the set of threshold values of that color channel. This may be done to generate a Boolean map that corresponds to that threshold for the particular color channel in the image or the video frame. Based on the comparison of expression (5), the adaptive thresholding module 214 may assign either a value of "1" or a value of "0" to the pixel. Accordingly, the Boolean maps that correspond to each threshold value in the set of threshold values for each color channel may be generated. For instance, in the aforementioned example, as there are 14 thresholds, 14 Boolean maps may be computed for each color channel. Each Boolean map may correspond to a two-dimensional (2D) array of the same dimension as the image or the video frame. Further, each Boolean map may indicate pixels in the image or the video frame that have color intensity greater than a specified threshold value associated with that Boolean map, for a given color channel.

As previously described, the color statistics module 212 may generate multiple histograms, one for each color channel, and perform similar processing for each of the color channels of the image or the video frame. Further, the adaptive thresholding module 214 may perform similar processing for each of the color channels. This may be done to generate multiple sets of Boolean maps, similar to the set of Boolean map generated for the first color channel. The multiple sets of Boolean maps, one set per color channel, are collectively referred as the plurality of Boolean maps. Thus, the adaptive thresholding module 214 may be configured to generate the plurality of Boolean maps for each color channel and each threshold value of each color channel, based on expression (5) above.

In accordance with an embodiment, the saliency detection module 216 may be configured to stack the plurality of Boolean maps generated for the set of color channels of the image or the video frame. Each Boolean map from the plurality of Boolean maps may comprise one or more regions that correspond to background and foreground objects. Each region from the one or more regions in a Boolean map may include a group of neighbor pixels with similar pre-defined pixel values.

In accordance with an embodiment, from the corresponding Boolean maps, the saliency detection module 216 may be configured to remove certain regions, which touch one or more boundaries of the image from the stacked plurality of Boolean maps. The saliency detection module 216 may apply one or more morphological operations known in the art, to identify such regions. In other words, all regions in the stacked plurality of Boolean maps that touch image borders may be removed. Examples of such operations may include, but may not be limited to, connected component analysis, morphological dilation, region-growing algorithm, and/or region-splitting algorithm.

Thus, the saliency detection module 216 may generate a plurality of processed Boolean maps, based on removal of the regions that touch the one or more boundaries of the corresponding Boolean maps. A person with ordinary skill in the art may understand that the step of stacking of the plurality of Boolean maps may be alternatively performed after the one or more boundary regions are removed from the image and/or the corresponding Boolean map.

In accordance with an embodiment, the saliency detection module 216 may be configured to add the plurality of processed Boolean maps. The saliency detection module 216 may be further configured to normalize the added plurality of processed Boolean maps by a value that corresponds to a total count of Boolean maps. In accordance with an embodiment, the normalization of the plurality of processed Boolean maps may be expressed as follows:

$$B_n = \frac{1}{n}\sum_{k=1}^{n} B_k \qquad (6)$$

where, "$B_n$" represents the normalized plurality of processed Boolean map; "$B_k$" represents $k^{th}$ processed Boolean map; and "n" represents total count of Boolean maps.

In accordance with an embodiment, the saliency detection module 216 may be configured to generate a saliency map. The generation of saliency maps may include a post-processing of the normalized and added plurality of processed Boolean maps. The post-processing of the normalized plurality of processed Boolean maps may be based on various image-processing techniques known in the art.

In accordance with an embodiment, the saliency detection module 216 may be configured to detect a region-of-interest that corresponds to a salient region in the generated saliency map. In accordance with an embodiment, the detection of the region-of-interest may be based no one or more saliency parameters. The one or more saliency parameters may be associated with the regions that correspond to the first set of regions identified as a set of foreground regions in the image. The one or more saliency parameters may be based on intensity values of the detected salient regions that exceed a threshold intensity value. The saliency detection module 216 may further identify at least one salient object that corresponds to the detected region-of-interest in the generated saliency map.

In accordance with an embodiment, the saliency map may be representative of a first set of color values that may have a lower frequency of occurrence in the image of the video frame than a second set of color values in the image or the video frame. The first set of color values may correspond to the salient region such that a majority of pixels in the salient region may have color values from the first set of color values. In accordance with an embodiment, the first set of color values may be associated with one or more of a foreground object and/or a moving object, which may be a salient object of interest in the image or the video frame. On the other hand, the second set of color values may be associated with a background region in the image or the video frame. Thus, a majority of pixels in the background region may have color values from the second set of color values.

In accordance with an embodiment, the identification of the salient object(s) may be incorporated in various application fields, such as video surveillance, image retargeting, video summarization, robot control, navigation assistance, object recognition, adaptive compression, and/or the like. The identification of the salient objects may be further useful in image-processing techniques (such as auto-focus algorithms), for an automatic detection of a focus area in the captured image and/or the video frame.

For instance, one or more salient objects may be identified in the image or the video frame, based on the saliency map of the image or the video frame. Thereafter, the processor 202 may determine an optimum adjustment of the one or more auto-focus settings of the imaging unit 204 based on the identification of the one or more salient objects. The processor 202 may perform automatic adjustment of the relevant auto-focus settings. The auto-focus settings may be adjusted such that the one or more salient objects are better focused in the image or video frame and/or a major portion of the one or more foreground objects is captured in the image or the video frame. Further, the processor 202 may display the one or more salient objects to the user highlighted regions within the image or the video frame, via the display screen 104. Alternatively, the processor 202 may present an option to a user with a recommendation of an optimum value for the one or more auto-focus settings of the imaging unit 204. Examples of the one or more auto-focus settings may include, but are not be limited to, a lens-aperture setting, a facial/smile detection setting, International Organization for Standardization (ISO) sensitivity setting, an image-focus setting, and/or an auto-exposure setting.

Figure 3:
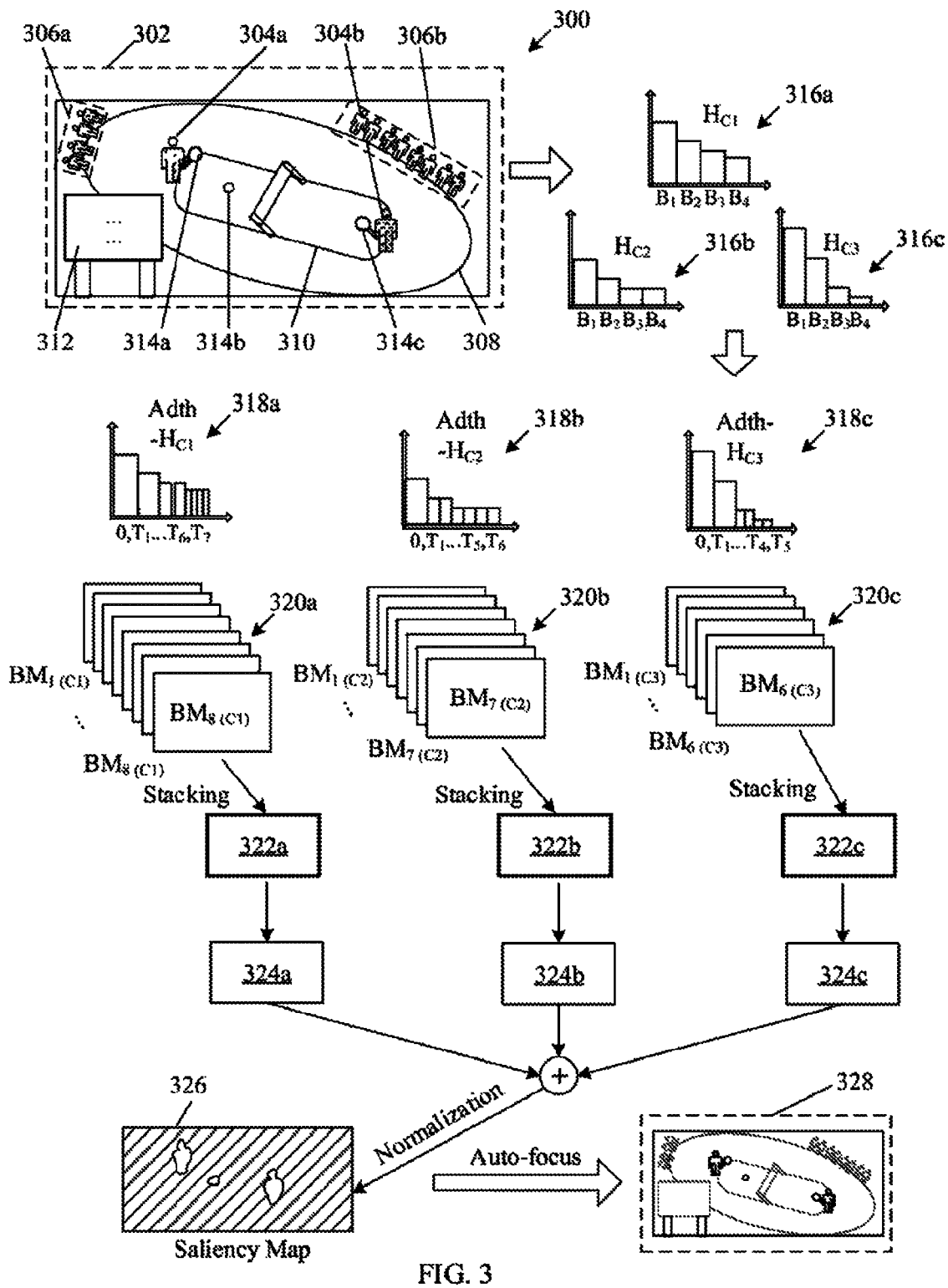
FIG. 3 illustrates an exemplary scenario for implementation of the disclosed method and system for image-processing to detect salient objects in an image, in accordance with an embodiment of the disclosure.

FIG. 3 illustrates an exemplary scenario for implementation of the disclosed method and system for image-processing to detect salient objects in an image, in accordance with an embodiment of the disclosure. FIG. 3 is explained in conjunction with FIG. 1 and FIG. 2. With reference to FIG. 3, there is shown an exemplary scenario 300 for implementation of the disclosed method and system for image-processing by use of the image-processing device 102, as described in FIG. 2. In accordance with the exemplary scenario 300, there is shown a video frame 302, which may be captured during a progress of a sports event, such as tennis or badminton. The video frame 302 illustrates a stadium 308 that includes a court 310, on which a match may be played between a first player 304*a* and a second player 304*b*, while a first set of audience members 306*a* and a second set of audience members 306*b* watch. The match may be played by use of a first racket 314*a* (by the first player 304*a*), a ball 314*b*, and a second racket 314*c* (by the second player 304*b*). The video frame 302 also illustrates that the stadium includes a score board 312, which displays a current match score of the first player 304*a* and the second player 304*b*.

There is further shown a first histogram 316*a* (represented by "$H_{C1}$"), for a second color channel, "$C_1$"; a second histogram 316*b* (represented by "$H_{C2}$"), for a second color channel, "$C_2$"; and a third histogram 316*c* (represented as "$H_{C3}$"), for a third color channel, "$C_3$", in the video frame 302. Each of the histograms 316*a* to 316*c* includes four bins, "$B_1$", "$B_2$", "$B_3$", and "$B_4$", each. Thus, pixel values in the video frame 302 may be divided into four bins for each of the three color channels "$C_1$", "$C_2$", and "$C_3$", during generation of the respective histograms.

There is further shown in FIG. 3 a first adaptively-thresholded histogram, 318*a* (represented as "Adth-$H_{C1}$"), for the first color channel, "$C_1$"; a second adaptively-thresholded histogram 318b (represented as "Adth-$H_{C2}$"), for the second color channel, "$C_2$"; and a third adaptively-thresholded histogram 318c (represented as "Adth-$H_{C3}$"), for the third color channel, "$C_3$". FIG. 3 further illustrates a first set of Boolean maps 320a (represented as $BM_1(C_1)$ to $BM_8(C_1)$), for the first color channel, "$C_1$"; a second set of Boolean maps 320b (represented as $BM_1(C_2)$ to $BM_7(C_2)$), for the second color channel, "$C_2$"; and a third set of Boolean maps 320c (represented as $BM_1(C_3)$ to $BM_6(C_3)$), for the third color channel, "$C_3$".

In addition, there is shown a first stacked Boolean map 322a for the first color channel "$C_1$", a second stacked Boolean map 322b for the second color channel "$C_2$", and a third stacked Boolean map 322c for the third color channel "$C_3$". Further, shown in FIG. 3 is a first processed Boolean map stack 324a for the first color channel "$C_1$", a second processed Boolean map stack 324b for the second color channel "$C_2$", and a third processed Boolean map stack 324c for the third color channel "$C_3$". Also shown in FIG. 3 is a saliency map 326 for the video frame 302, generated based on addition and normalization of the first processed Boolean map stack 324a, the second processed Boolean map stack 324b, and the third processed Boolean stack 324c. Further, shown in FIG. 3 is a second video frame 328, which may correspond to a video frame or an image captured subsequent to the video frame 302. The second video frame 328 may be captured based on dynamic adjustment of auto-focus settings of the image unit 204. The dynamic adjustment of the auto-focus settings may be based on the saliency map 326.

In accordance with the exemplary scenario, the transceiver 218 in the image-processing device 102 may be configured to receive a video stream from the imaging unit 204. The video stream may include a plurality of video frames, such as the video frame 302. In such a case, the imaging unit 204 may be configured to capture the video stream in response to a request triggered by a user, based on an action, such as hardware or software button-press action. The video frame 302 may correspond to a video stream of the tennis match. The video frame 302 may comprise a plurality of regions. The plurality of regions may correspond to a plurality of objects, such as the first player 304a, the second player 304b, the first set of audience members 306a, the second set of audience members 306b, the stadium 308, the court 310, the score board 312, the first racket 314a, the ball 314b, and the second 314c.

The transceiver 218 may be configured to communicate the received video frame 302 to the processor 202. In accordance with an embodiment, the processor 202 may be configured to identify and differentiate the plurality of objects as background and foreground objects. In accordance with an embodiment, the processor 202 may be configured to perform de-correlation of the plurality of color channels of the video frame 302, to reduce cross-correlation within the plurality of color channels, based on one or more de-correlation techniques known in the art.

In accordance with an embodiment, the processor 202 may communicate the video frame 302 to the color statistics module 212 for further processing. The color statistics module 212 may be configured to generate a histogram of pixel values for each color channel in the video frame 302, as described in FIG. 2. The histogram for a color channel may include a plurality of bins with a predetermined bin size, based on pixel values in that color channel. For instance, as shown in FIG. 3, the color statistics module 212 may generate the first histogram 316a, for the first color channel "$C_1$". The first histogram 316a, may include four bins $B_1$, $B_2$, $B_3$, and $B_4$, as illustrated in FIG. 3, for exemplary purposes. Similarly, the color statistics module 212 may generate the second histogram 316b, and the third histogram 316c, for the second color channel "$C_2$" and the third color channel "$C_3$", respectively. Thereafter, the color statistics module 212 may compute average bin values; avg_bin($H_{C1}$), avg_bin($H_{C2}$), avg_bin($H_{C3}$); for the first histogram 316a, the second histogram 316b, the third histogram 316c, respectively, based on expression (1), as explained in FIG. 2.

In accordance with an embodiment, the adaptive thresholding module 214 may be configured to determine an adaptive threshold step size for each bin in each of: the first histogram 316a, the second histogram 316b, the third histogram 316c, based on the expressions (2), (3.1) to (3.4), and (4), as explained in FIG. 2. As described, the adaptive threshold step size may be used to perform adaptive thresholding of the pixel values in each bin by division of the respective bins according to the adaptive threshold size determined for that bind. From such a division of the each bin, a set of threshold values may be obtained, which may be later used for generation of Boolean maps for the color channel. For instance, as shown in FIG. 3, the first bin "$B_1$" and the second bin "$B_2$" of the first histogram 316a remain unchanged in the first adaptively-thresholded histogram 318a. Further, the third bin "$B_3$" of the first histogram 316a is divided into two parts in the first adaptively-thresholded histogram 318a. In addition, the first adaptively-thresholded histogram 318a includes four distinct equal bins that correspond to the fourth bin "$B_4$" of the first histogram 316a. Thus, there are a total of eight threshold values, such as 0, $T_1, \ldots T_6$, and $T_7$, for the first color channel "$C_1$". Similarly, the adaptive thresholding module 214 may generate the second adaptively-thresholded histogram, 318b, and the third adaptively-thresholded histogram 318c, from the second histogram 316b and the third histogram 316c, respectively.

In accordance with an embodiment, the adaptive thresholding module 214 may be further configured to generate a set of Boolean maps for each color channel, based on the adaptive thresholding and the set of threshold values determined for that color channel. The adaptive thresholding module 214 may use expression (5) to generate the set of Boolean maps, as explained in FIG. 2. For instance, as shown in FIG. 3, in reference to the first adaptively-thresholded histogram 318a, each threshold from the set of threshold value, 0, $T_1, \ldots T_6$, $T_7$ may be used to generate a Boolean map for the first color channel "$C_1$". The Boolean map $BM_1(C_1)$ in the first set of Boolean maps 320a may be a Boolean map that represents pixel values having a value greater than 0 for the color channel "$C_1$" in the video frame 302. Similarly, the Boolean map $BM_8(C_1)$ in the first set of Boolean maps 320a may correspond to a Boolean map representative of pixel values greater than the threshold value "$T_7$" for the color channel "$C_1$" in the video frame 302. Thus, the first set of Boolean maps 320a may be generated for the first color channel "$C_1$". Similarly, the second set of Boolean maps 320b and the third set of Boolean maps 320c may be generated for the second color channel "$C_2$" and the third color channel "$C_3$".

In accordance with an embodiment, the saliency detection module 216 may be configured to stack Boolean maps of the first set of Boolean maps 320a, to generate the first stacked Boolean map 322a. The stacking may be performed by the overlay of regions of pixels that have been assigned Boolean value of "1" at least one Boolean map from the first set of Boolean maps 320a. In accordance with an embodiment, the stacking operation may correspond to a Boolean "AND" or a Boolean "OR" operation on the overlaid regions of pixels. Thus, stacking of the overlaid regions of pixels may yield either an overlap ("AND" operation) or a union ("OR" operation) between the regions assigned a Boolean value of "1" in the individual Boolean maps. In a similar manner, the saliency detection module 216 may be configured to stack Boolean maps of the second set of Boolean maps 320b, to generate the second stacked Boolean map 322b. Further, the third set of Boolean maps 320c, may be stacked to generate the third stacked Boolean map 322c.

In accordance with an embodiment, the saliency detection module 216 may be further configured to detect one or more regions that may touch one or more boundaries of the video frame 302. The saliency detection module 216 may apply one or more morphological operations, known in the art, to identify such regions that may touch the one or more boundaries of the video frame 302. Examples of such operations may include, but may not be limited to, connected component analysis, morphological dilation, region-growing algorithm, and/or region-splitting algorithm. Thereafter, the saliency detection module 216 may remove a region of overlap between the identified one or more boundary regions and regions having a Boolean value of "1" in each of the stacked Boolean maps to generate a respective processed Boolean map stack. The pixels that lie in the region of overlap with the boundary regions in a Boolean map stack may be reset to a Boolean value of "0", and may be removed from the final Boolean map associated with the respective processed Boolean map stack. Thus, the saliency detection module 216 may generate the first processed Boolean map stack 324a, the second processed Boolean map stack 324b, and the third processed Boolean map stack 324c, based on the removal of the one or more boundary regions from the first stacked Boolean map 322a, the second stacked Boolean map 322b, and the third stacked Boolean map 322c, respectively. A person with ordinary skill in the art may understand that the process of stacking of the Boolean maps may alternatively be performed at an inter-color channel level, instead of the intra-color channel stacking illustrated in FIG. 3, without departure from the scope of the disclosure.

In accordance with an embodiment, the saliency detection module 216 may be further configured to perform addition and normalization of the first processed Boolean map stack 324a, the second processed Boolean map stack 324b, and the third processed Boolean map stack 324c, to generate the saliency map 326. The generation of the saliency map 326, based on the addition and the normalization, is explained in conjunction with FIG. 2. In accordance with an embodiment, the saliency map 326 may include a Boolean map representation of one or more salient objects of the video frame 302. The saliency detection module 216 may detect a region-of-interest in the video frame 302, based on the saliency map 326. In accordance with an embodiment, the region-of-interest may correspond to a salient region that includes at least of the one or more salient objects, such as the ball 314b, the first player 304a with the first racket 314a, the second player 304b with the second racket 314c, of the video frame 302.

In accordance with an embodiment, the saliency map 326 may represent a first set of color values that have a lower frequency of occurrence than a second set of color values in the video frame 302. The first set of color values may correspond to the salient region. Further, the first set of color values may be associated with one or more of: a foreground object and/or a moving object, while the second set of color values may be associated with a background region in the video frame 302. For instance, as shown in FIG. 3, the saliency map 326 depicts a Boolean map representative of an outline of salient objects present in the video frame 302. For instance, the saliency map 326 illustrates the outline of the first player 304a, the second player 304b, the first racket 314a, the ball 314b, and the second racket 314c, which may correspond to the salient objects of the video frame 302. A person skilled in the art may understand that such salient objects may be objects-of-interest for viewers of the video frame 302.

Further, each such salient object may be represented by a first set of colors, which may be rare in the video frame 302, as compared to other colors present in the video frame 302. That is, the frequency of occurrence of the first set of colors in the video frame 302 may be lower than that of a second set of more frequently occurring colors in the video frame 302. Such second set of colors that may occur more frequently in the video frame 302 may correspond to background regions of the video frame 302. For instance, the court 310 and the stadium 308 may be represented with more frequently occurring colors of the video frame 302, and hence, may correspond to background regions of the video frame 302.

In accordance with an embodiment, the processor 202 may be configured to automatically adjust optimum auto-focus settings for a same or next image or video capture by the imaging unit 204, based on the generated saliency map 326. In accordance with an embodiment, the optimum auto-focus settings may be such that the salient objects are focused properly, while the foreground objects lie within a field-of-view of the image or video frame. The dynamic adjustment of the auto-focus settings may increase enhance the image or video frame based on a better focus on salient objects in the imaging. As discussed, the salient objects may have rarer colors than colors of other objects present in the image or video frame 302. Further, the use of adaptive-threshold step size for processing of pixel values of the color channels may promote rarity in the color values in the saliency maps, as explained in FIG. 2.

The processor 202 may dynamically perform the adjustment of the auto-focus setting and display the automatically adjusted setting values to the user, via the display screen 104. Alternatively, the processor 202 may display a prompt to the user with a corresponding recommendation for change of the auto-focus setting, via the display screen 104. Examples of the auto-focus settings may include, but may not be limited to, a lens-aperture setting, a facial/smile detection setting, International Organization for Standardization (ISO) sensitivity setting, an image-focus setting, and/or an auto-exposure setting.

In accordance with an embodiment, the processor 202 may perform the adjustment of the auto-focus settings of the imaging unit 204, as explained above. Thereafter, one or more subsequent images or video frames may be captured with the adjusted auto-focused settings. Such images or video frames may be better focused with respect to the salient object and/or may include at least a major portion of the one or more foreground objects identified based on the saliency map. For instance, the second video frame 328 may correspond to a video frame or an image, captured subsequent to the video frame 302, based on dynamic adjustment of auto-focus settings of the imaging unit 204, based on the saliency map 326.

Figure 4A:
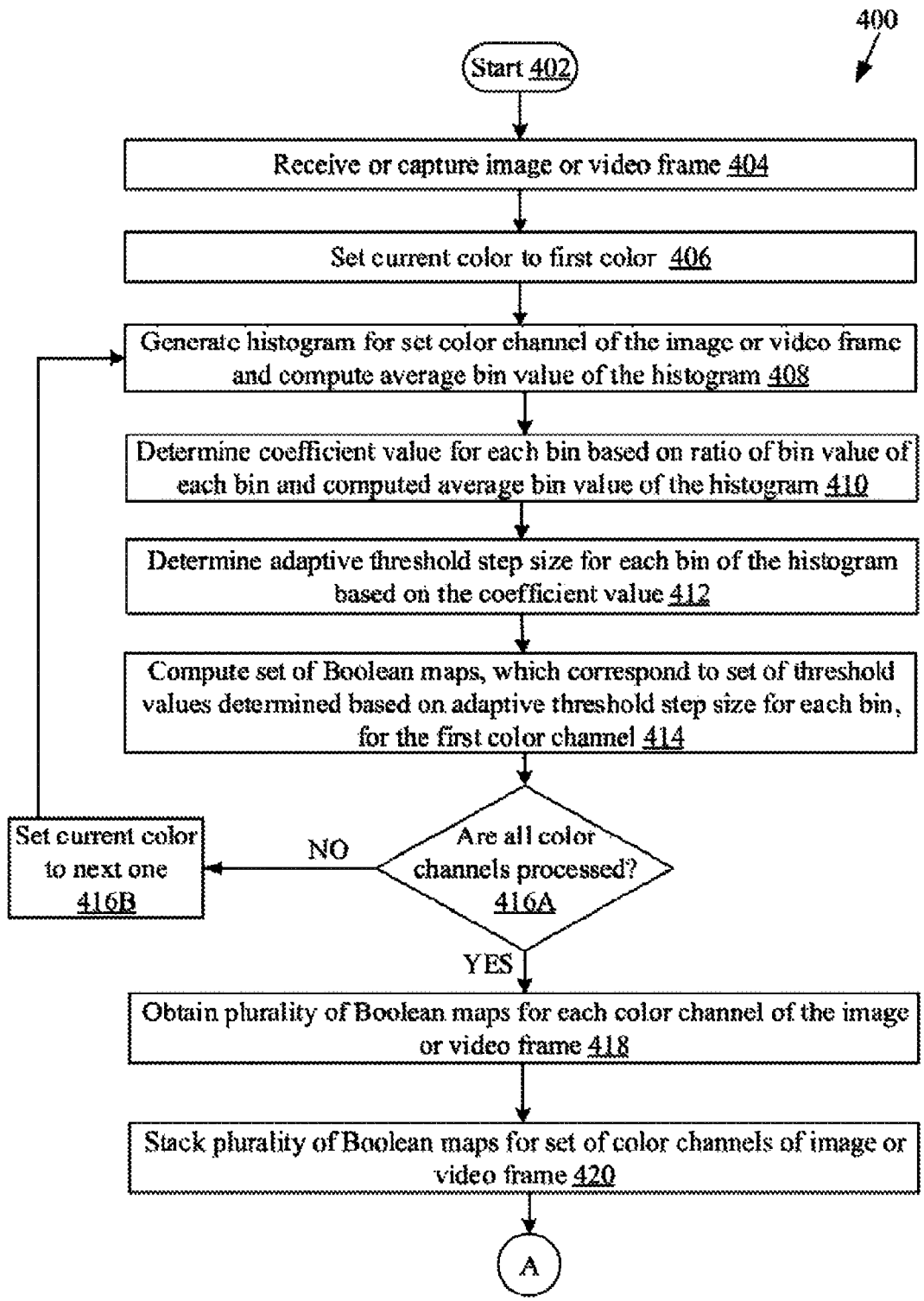
FIGS. 4A and 4B, collectively, depict a flowchart that illustrates a method for image-processing to detect salient objects in an image, in accordance with an embodiment of the disclosure.
Figure 4B:
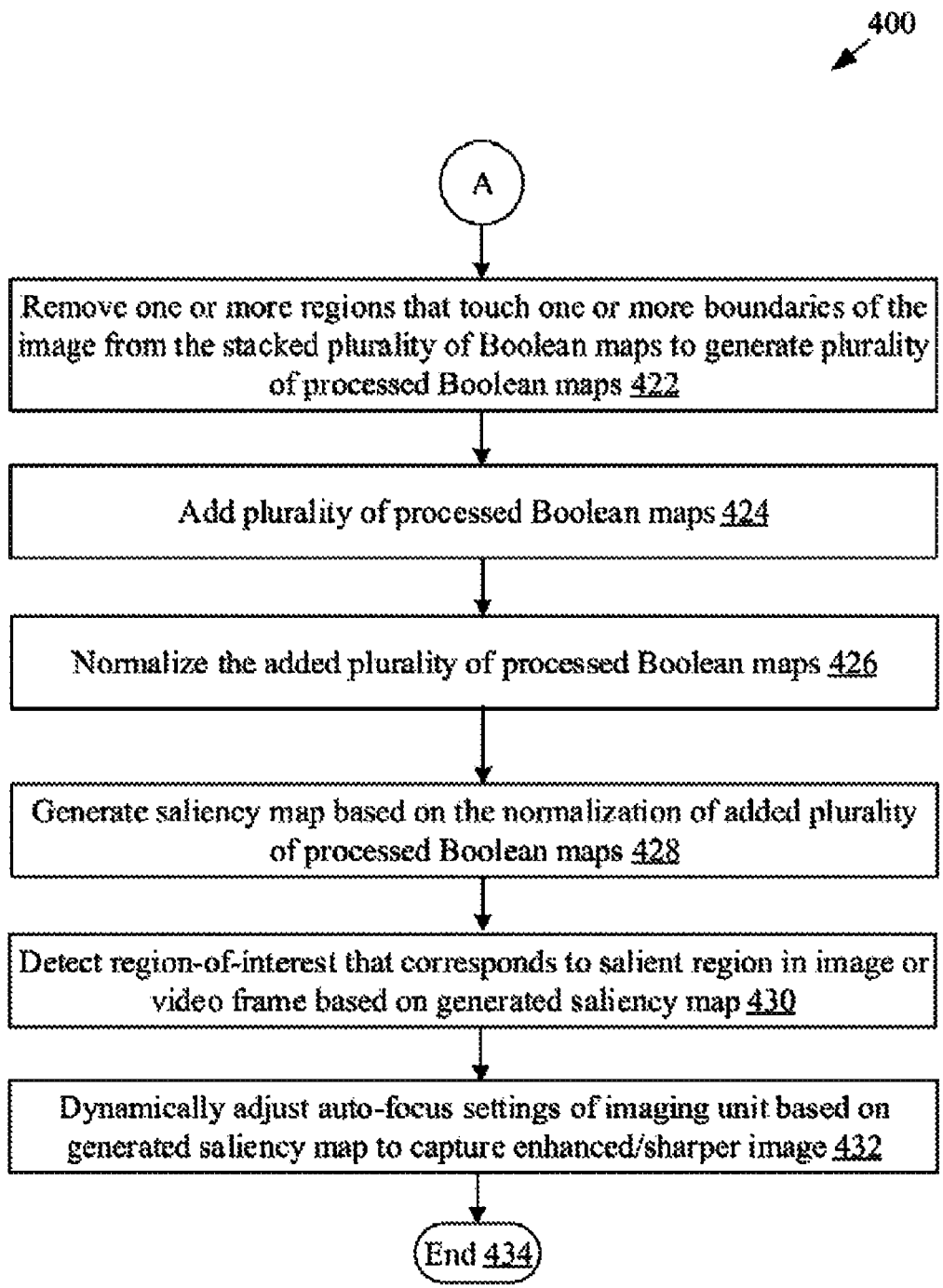

FIGS. 4A and 4B depict flowchart that illustrates a method for image-processing for detection of salient objects in an image, in accordance with an embodiment of the disclosure. FIGS. 4A and 4B are described in conjunction with elements of FIGS. 1, 2, and 3. The method comprises a flowchart 400, which may be implemented by the image-processing device 102. The image-processing device 102 may be communicatively coupled to the plurality of cloud-based resources 106, as described in FIG. 1. With reference to FIG. 4A, the method of the flowchart 400 begins at step 402 and proceeds to step 404.

At step 404, an image or a video frame (such as the video frame 302), may be captured by the imaging unit 204, or may be received from the plurality of cloud-based resources 106, by the transceiver 218, via the communication network 108. The video frame 302 may include a plurality of color channels. After receipt of the image, a de-correlation of the plurality of color channels of the video frame 302 may be optionally performed based on a whitening operation. The de-correlation of the plurality of color channels in the video frame 302 may be performed to reduce a cross-correlation within the plurality of color channels. In accordance with an embodiment, the de-correlation of the plurality of color channels of the video frame 302 may not be performed. At step 406, current color associated with the received image or video frame may be set to a first color.

At step 408, a histogram may be generated for the set color channel (such as the first color channel) from the plurality of color channels of the video frame 302, based on pixel values of pixels in the video frame 302. Further, an average bin value of the histogram may be computed. In accordance with an embodiment, the color statistics module 212 may be configured to generate the histogram of the set color channel (such as the first color channel) and compute the average bin value of the generated histogram, based on expression (1), as explained in FIG. 2.

At step 410, a coefficient value may be determined for each bin in the histogram for the set color channel (such as the first color channel). In accordance with an embodiment, the adaptive thresholding module 214 may be configured to determine one coefficient value for each bin of the histogram, thereby computing as many coefficient values as the number of bins in the histogram. In accordance with an embodiment, the coefficient value of a bin may be determined based on the radio of the bin value of that bin and the computed average bin value of the histogram of the set color channel (such as the first color channel that may be currently set). The determination of the coefficient value may be performed based on expressions (2), (3.1) to (3.4), as explained further in FIG. 2.

At step 412, an adaptive threshold step size may be determined for each bin of the histogram for the set color channel (such as the first color channel). In accordance with an embodiment, the adaptive thresholding module 214 may be configured to determine the adaptive threshold step size based on the ratio of the bin value of each bin and the computed average bin value of the histogram for the first color channel. The adaptive threshold step size for a bin may also be determined based on a ratio of the predetermined bin size and the determined value of the coefficient for that bin. The determination of the adaptive threshold step size may be performed based on expressions (2), (3.1) to (3.4), and (4), as explained in FIG. 2.

At step 414, a set of Boolean maps may be computed for the set color channel (such as the first color channel that may be currently set). In accordance with an embodiment, the adaptive thresholding module 214 may be configured to compute the set of Boolean maps for the first color channel, based on the adaptive threshold step size. Each Boolean map in the set of Boolean maps may correspond to a set of threshold values determined by the adaptive threshold step size, which may be used for adaptive thresholding of the pixel values of the video frame 302, as explained in FIG. 2. Based on a comparison of each pixel's value with a particular threshold value, the pixel may be assigned a Boolean value of "1" (when the pixel may be greater than the threshold) or "0" (otherwise) to generate a Boolean map associated with that threshold value.

At step 416A, a check is performed to determine whether all the color channels of the video frame 302 have been processed for the computation of respective sets of Boolean maps. In accordance with an embodiment, the processor 202 may perform the check. When the processor 202 determines that not all the color channels have been processed for generation of the respective sets of Boolean maps, the control may pass to step 416B. When the processor 202 determines that all the color channels have been processed for generation of the respective sets of Boolean maps, the control may pass to step 418. At step 416B, the current color associated with the received image or video frame may be set to a next one (such as a next color). The control may then pass back to the step 408 and the steps 408 to 414, and 416A may be repeated for each of the other color channels of the video frame 302 until all the color channels have been processed.

At step 418, a plurality of Boolean maps is obtained for each color channel. The plurality of Boolean maps may include the individual set of Boolean maps for each color channel of the video frame 302. At this stage, control passes to step 420. At the step 420, the generated plurality of Boolean maps may be stacked. In accordance with an embodiment, the saliency detection module 216 may be configured to stack the plurality of Boolean maps. In accordance with an embodiment, the stacking of the plurality of the Boolean maps may be performed at an intra-color channel level. An example of intra-color channel level stacking is illustrated in FIG. 3. For instance, with reference to FIG. 3, the first stacked Boolean map 322a may be generated based on stacking of the first set of Boolean maps 320a, for the first color channel "$C_1$". Alternatively, the stacking of the plurality of Boolean maps may be performed at an inter-color channel level. At this stage, control passes to step 422 of the flowchart 400, which is illustrated in FIG. 4B.

With reference to FIG. 4B, at step 422, one or more regions, from the stacked plurality of Boolean maps, which touch one or more boundaries of the image or video frame 302 are removed. In accordance with an embodiment, the saliency detection module 216 may be configured to identify such one or more regions, based on application of one or more morphological operations and/or other image processing techniques on the image or the video frame 302. Further, the saliency detection module 216 may be configured to remove the identified one or more regions from the stacked plurality of Boolean maps to generate a plurality of processed Boolean maps.

At step 424, the plurality of processed Boolean maps may be added. In accordance with an embodiment, the saliency detection module 216 may be configured to add the plurality of processed Boolean maps, based on a union of pixel regions represented by a Boolean value of "1" in each of the individual processed Boolean map that are to be added. At step 426, the added plurality of processed Boolean maps may be normalized. In accordance with an embodiment, the saliency detection module 216 may be configured to normalize the added plurality of processed Boolean maps, based on expression (6), as explained in FIG. 2.

At the step 428, a saliency map may be generated. In accordance with an embodiment, the saliency detection module 216 may be configured to generate the saliency map based on the normalization of the added plurality of processed Boolean maps.

At step 430, a region-of-interest that may correspond to a salient region in the image or the video frame 302 may be detected. In accordance with an embodiment, the processor 202 and/or the saliency detection module 216 may be configured to detect the region-of-interest that may correspond to the salient region in the image or the video frame 302 based on the saliency map, by use of one or more image processing techniques. In accordance with an embodiment, the saliency map may be representative of an indication of one or more salient objects in the image or the video frame 302. The one or more salient objects may include one of: an object in a foreground region and/or a moving object in the image of the video frame 302. Further, the saliency region may be associated with a first set of colors that may be less frequent or rarer than other colors in the image or the video frame 302. The salient objects may be associated with such lesser frequent or rarer first set of colors. On the other hand, an object in a background region or a static object may be associated with the other more frequently occurring colors.

The adaptive thresholding of the pixel values may promote rarity of the less frequent colors in the saliency maps as compared to the more frequent colors. The bins that correspond to the rarer colors in the histogram may tend to get split up into more number of adapted bins than the other colors, based on the adaptive thresholding. Hence, the adapted bin size of the bins associated with the other colors may have a larger size than that of the rarer colors. Thus, when Boolean maps may be generated based on the adaptive thresholding and later processed for generation of the saliency map, lesser background regions may be associated with the final saliency map. A person skilled in the art may understand that the final saliency map may more accurately represent rarer colors than the other more frequent colors ad the rarer colors may be reflected at a higher granularity due to more number of splitting at the stage of adaptive thresholding.

At step 432, one or more auto-focus settings of the imaging unit 204 may be dynamically adjusted. In accordance with an embodiment, the processor 202 may be configured to dynamically adjust the one or more auto-focus settings of the imaging unit 204, based on the saliency map. The processor 202 and/or the saliency detection module 216 may be configured to detect one or more salient objects in the video frame 302, based on the saliency map, as explained above step. The salient objects may be of interest to a user and may require auto-focusing and post-processing for image enhancement to better capture of such objects in the video frame 302. The process of dynamic adjustment of the auto-focus settings is explained further in conjunction with FIGS. 2 and 3. Control passes to end step 434.

Various embodiments of the disclosure may provide a non-transitory computer readable medium and/or storage medium, wherein there is stored thereon, a machine code and/or a computer program with at least one code section executable by a machine and/or a computer to process an image. The at least one code section may cause the machine and/or computer to perform the steps that comprise the generation of a saliency map of the image. An average bin value of a histogram for a first color channel of the image may be computed. The histogram may include a plurality of bins with a pre-determined bin size based on pixel values of a plurality of pixels in the first color channel. Further, an adaptive threshold step size may be determined for each bin of the plurality of bins in the histogram. The determination of the adaptive threshold step size may be based on a ratio of a bin value of each bin of the plurality of bins and the computed average bin value of the histogram. Thereafter, a set of Boolean maps, which may correspond to a set of threshold values, may be computed. The set of threshold values, in-turn, may be determined based on the determined adaptive threshold step size for each bin. Further, a saliency map may be generated, based on the computed set of Boolean maps.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to be particular embodiment disclosed, but that the present disclosure will include all embodiments that fall within the scope of the appended claims.

What is claimed is:

1. A method for image processing, said method comprising:

computing, by an image-processing device, an average bin value of a histogram for a first color channel of an image, wherein said histogram includes a plurality of bins with a determined bin size based on pixel values of a plurality of pixels in said first color channel;

determining, by said image-processing device, an adaptive threshold step size for each bin of said plurality of bins in said histogram, based on a ratio of a bin value of each bin of said plurality of bins and said computed average bin value of said histogram;

computing, by said image-processing device, a set of Boolean maps that correspond to a set of threshold values determined based on said determined adaptive threshold step size for each bin;

generating, by said image-processing device, a saliency map of said image based on at least said computed set of Boolean maps; and adjusting, by said image-processing device, at least one auto-focus setting of an image-capturing device based on said generated saliency map of said image, said image-capturing device associated with said image-processing device.

2. The method of claim 1, further comprising converting, by said image-processing device, a set of color channels of a first color model to a corresponding set of color channels of a second color model to obtain said image with de-correlated color channels, wherein said converted set of color channels includes at least said first color channel.

3. The method of claim 1, wherein a count of said determined set of threshold values of said first color channel of a set of color channels is based on said determined adaptive threshold step size, a minimum pixel value, and a maximum pixel value of said first color channel.

4. The method of claim 3, further comprising generating, by said image-processing device, a first plurality of Boolean maps for said set of color channels, wherein said generated first plurality of Boolean maps includes said computed set of Boolean maps for said first color channel.

5. The method of claim 4, further comprising stacking, by said image-processing device, said generated first plurality of Boolean maps for said set of color channels.

6. The method of claim 5, further comprising removing, by said image-processing device, at least one region in said stacked first plurality of Boolean maps that touch at least one boundary of said image, and generating a second plurality of Boolean maps based on said removal of said at least one region in said stacked first plurality of Boolean maps.

7. The method of claim 6, further comprising adding, by said image-processing device, said generated second plurality of Boolean maps for said generation of said saliency map.

8. The method of claim 7, further comprising normalizing, by said image-processing device, said added said second plurality of Boolean maps for said generation of said saliency map.

9. The method of claim 1, further comprising adaptively thresholding, by said image-processing device, said pixel values of said plurality of pixels in said first color channel based on said determined adaptive threshold step size.

10. The method of claim 1, further comprising determining, by said image-processing device, a coefficient value based on said ratio of said bin value of each bin of said plurality of bins and said computed average bin value of said histogram, wherein said adaptive threshold step size is determined based on said determined coefficient value and said determined bin size.

11. The method of claim 1, further comprising detecting, by said image-processing device, a region-of-interest that corresponds to a salient region in said image based on said generated saliency map.

12. The method of claim 11, wherein said saliency map is representative of a first set of color values having a lower frequency of occurrence in said image than a second set of color values in said image, wherein said first set of color values corresponds to said salient region.

13. The method of claim 12, wherein said first set of color values are associated with one or more of: a foreground object and/or a moving object, and wherein said second set of color values is at least associated with a background region in said image.

14. The method of claim 1, wherein said at least one auto-focus setting of said image-capturing device includes at least one of: a lens-aperture setting, a facial detection setting, International Organization for Standardization (ISO) sensitivity setting, an image-focus setting, or an auto-exposure setting.

15. A system for image processing, said system comprising:

an image-processing device comprising circuitry configured to:

compute an average bin value of a histogram for a first color channel of an image, wherein said histogram includes a plurality of bins with a determined bin size based on pixel values of a plurality of pixels in said first color channel;

determine an adaptive threshold step size for each bin of said plurality of bins in said histogram, based on a ratio of a bin value of each bin of said plurality of bins and said computed average bin value of said histogram;

compute a set of Boolean maps that correspond to a set of threshold values determined based on said determined adaptive threshold step size for each bin;

generate a saliency map of said image based on at least said computed set of Boolean maps; and adjust at least one auto-focus setting of an image-capturing device based on said generated saliency map of said image, said image-capturing device associated with said image-processing device.

16. The system of claim 15, wherein said circuitry is further configured to generate a first plurality of Boolean maps for a set of color channels that include said first color channel, wherein said generated first plurality of Boolean maps includes said computed set of Boolean maps for said first color channel.

17. The system of claim 16, wherein said circuitry is further configured to:

stack said generated first plurality of Boolean maps for said set of color channels;

remove at least one region in said stacked first plurality of Boolean maps that touch at least one boundary said image; and generate a second plurality of Boolean maps based on said removal of said at least one region in said stacked first plurality of Boolean maps.

18. The system of claim 17, wherein said circuitry is further configured to:

add said generated second plurality of Boolean maps for said generation of said saliency map; and normalize said added said second plurality of Boolean maps for said generation of said saliency map.

19. The system of claim 15, wherein said saliency map is representative of a first set of color values having a lower frequency of occurrence in said image than a second set of color values in said image, wherein said first set of color values corresponds to a salient region in said image.

20. The system of claim 15, wherein said at least one auto-focus setting of said image-capturing device includes at least one of: a lens-aperture setting, a facial detection setting, International Organization for Standardization (ISO) sensitivity setting, an image-focus setting, or an auto-exposure setting.

* * * * *